May 10, 1949.  H. E. WESSELS  2,469,534
LAWN SPRINKLER
Filed June 21, 1945
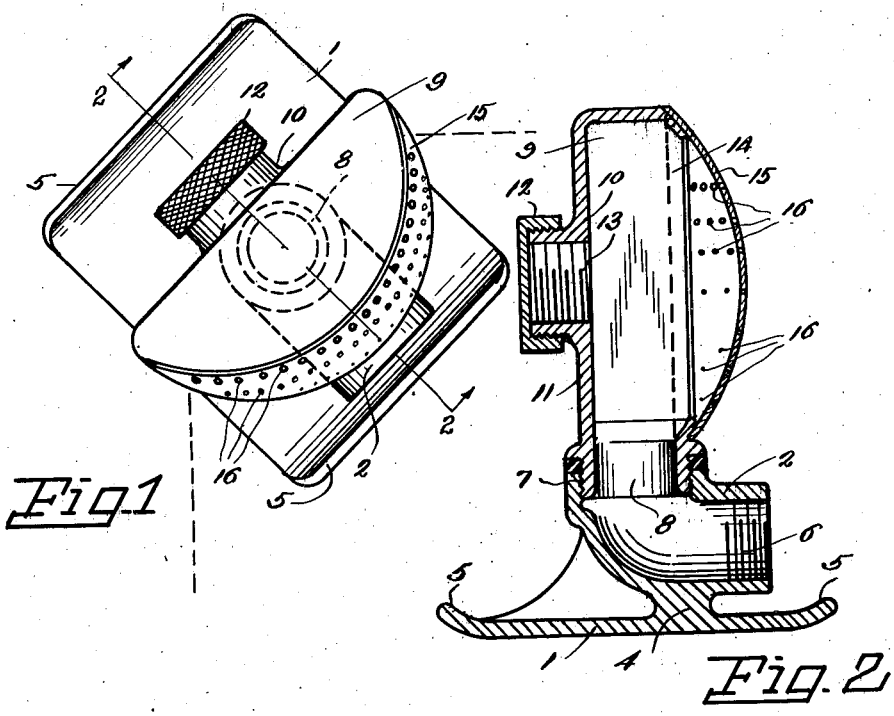
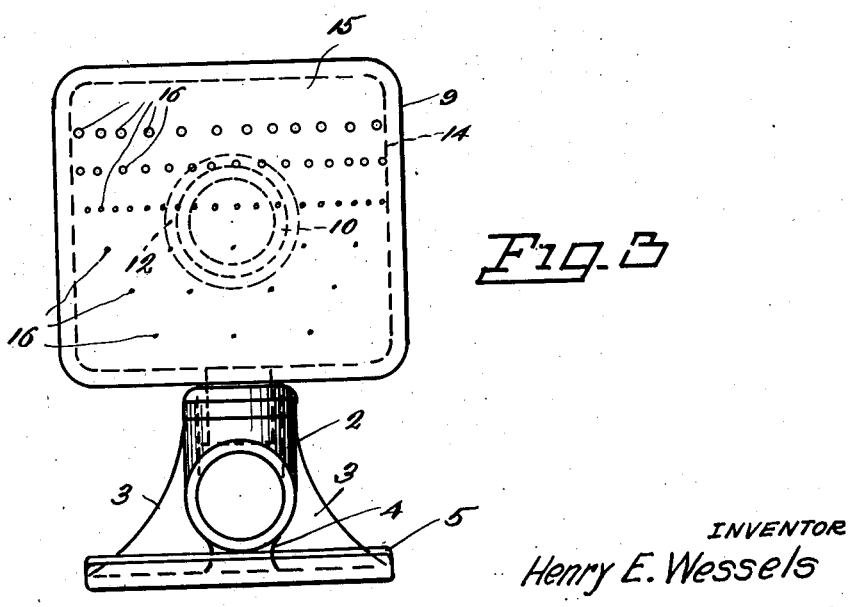
INVENTOR
Henry E. Wessels
BY Glenn L. Fish
ATTORNEY Patented May 10, 1949

2,469,534

UNITED STATES PATENT OFFICE 2,469,534

LAWN SPRINKLER

Henry E. Wessels, Spokane, Wash., assignor to Glenn L. Fish, Spokane, Wash.

Application June 21, 1945, Serial No. 600,735

1 Claim. (Cl. 299—141)

This invention relates to sprinklers and it is one object of the invention to provide a sprinkler adapted to be applied to the nozzle-engaging terminal at one end of a hose and then set upon the ground so that a spray of water will be discharged from the sprinkler for watering a lawn or flower bed.

Another object of the invention is to provide a sprinkler so formed that a spray of water will be discharged laterally from the sprinkler instead of vertically therefrom and allow a flower bed or a portion of a lawn to be watered without other surrounding portions of a lawn being sprayed with water.

Another object of the invention is to provide a sprinkler wherein a nozzle is carried by a base which rests upon the ground and is adapted for connection with a hose, the nozzle being so formed that it may be removed from an elbow forming part of the base and disposed in position to discharge a spray upwardly instead of laterally or directly applied to the terminal of the hose for spraying a lawn.

Another object of the invention is to provide a sprinkler which is simple in construction and capable of being manufactured at small cost.

The invention is illustrated in the accompanying drawings wherein:

Fig. 1 is a top plan view of the improved sprinkler.

Fig. 2 is a vertical sectional view taken along line 2—2 of Figure 1.

Fig. 3 is a view looking at the front of the sprinkler.

This improved sprinkler has a base 1 carrying an elbow 2 which is braced by webs 3 so that it will not be liable to become broken at the point 4 where it is connected with the base. End portions of the base are curved upwardly to form lips 5 and allow the base to be slid along the ground from one place to another without catching against grass or rough places in the ground and turning over. The lower end of the elbow is internally threaded, as shown at 6, for engagement with the terminal of a hose and the upper end of the elbow is also internally threaded, as shown at 7, to receive the externally threaded neck 8 which extends downwardly from the nozzle 9 or the neck 10 which projects from the rear wall 11 of the nozzle centrally thereof. This neck 10 is externally threaded to receive an internally threaded cap 12 and is internally threaded, as shown at 13, so that when the nozzle is unscrewed from the elbow it may be applied to the terminal of a hose. When the neck 8 is unscrewed from the elbow 2 and the neck 10 applied to a hose or to the elbow the cap is screwed upon the neck 8 so that this neck will be closed and water prevented from escaping through it. The casing of the nozzle is open at its front and this open front is surrounded by a flange 14 to which is firmly secured a front wall 15 consisting of a plate of sheet metal having horizontally extending rows of perforations 16 formed therein. The front wall or plate 15 is of concavo-convexed formation so that it bulges outwardly, and upon referring to Figure 3 it will be seen that the perforations in the lowest row are very small and that the openings or perforations gradually incease in size towards the top of the front wall. Therefore when the sprinkler is in use grass of a flower bed close to the sprinkler will be watered by a very fine spray while grass at a greater distance will be watered by larger streams. Therefore damage will not be done by large streams of water striking flowers or grass injured by being subjected to action of streams of water of such size that they are liable to uproot the grass. This will also be true when the neck 10 is directly applied to a hose and the cap 12 screwed upon the neck 8.

Having thus described the invention what is claimed is:

In a sprinkler for a hose, a nozzle comprising casing open at its front and having a rear wall and upper and lower side walls, a plate closing the open front of said casing and formed with a multiplicity of perforations constituting water outlets for forming a spray of water discharged through the said perforations, an externally threaded neck extending outwardly from the lower side wall, an externally threaded neck extending outwardly from the rear wall, said necks being of the same dimensions whereby either may be screwed into a coupling for detachably connecting the nozzle with a hose, and an internally threaded cap of dimensions adapting it to be removably screwed upon either neck.

HENRY E. WESSELS.

REFERENCES CITED

The following references are of record in the file of this patent:

UNITED STATES PATENTS

| Number | Name | Date |
|---|---|---|
| 139,550 | Cronin | June 3, 1873 |
| 1,089,179 | Zeyssolff | Mar. 3, 1914 |
| 1,166,374 | Jackson | Dec. 28, 1915 |
| 1,187,373 | Nomiya | June 13, 1916 |
| 1,193,010 | Gibbs | Aug. 1, 1916 |
| 1,539,331 | Siemann | May 26, 1925 |
| 2,069,667 | Clawson | Feb. 2, 1937 |
| 2,127,715 | Bonner | Aug. 23, 1938 |
| 2,271,823 | Hundertmark | Feb. 3, 1942 |
| 2,288,101 | Mayer | June 30, 1942 |